US008187993B2

(12) United States Patent
Harris

(10) Patent No.: US 8,187,993 B2
(45) Date of Patent: May 29, 2012

(54) METHODS AND COMPOSITIONS FOR STABILIZING CATALYTIC PROCESSES

(75) Inventor: Thomas V. Harris, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 406 days.

(21) Appl. No.: 12/611,695

(22) Filed: Nov. 3, 2009

(65) Prior Publication Data

US 2011/0105299 A1 May 5, 2011

(51) Int. Cl.
*B01J 31/06* (2006.01)

(52) U.S. Cl. ........................................................ 502/159

(58) Field of Classification Search ........................ None
See application file for complete search history.

(56) References Cited

U.S. PATENT DOCUMENTS

| | | | |
|---|---|---|---|
| 4,122,245 | A | 10/1978 | Nardi et al. |
| 4,463,071 | A | 7/1984 | Gifford et al. |
| 4,463,072 | A | 7/1984 | Gifford et al. |
| 5,104,840 | A | 4/1992 | Chauvin et al. |
| 5,731,101 | A | 3/1998 | Sherif et al. |
| 5,750,455 | A | 5/1998 | Chauvin et al. |
| 6,028,024 | A | 2/2000 | Hirschauer et al. |
| 6,235,959 | B1 | 5/2001 | Hirschauer et al. |
| 6,797,853 | B2 | 9/2004 | Houzvicka et al. |
| 7,495,144 | B2 | 2/2009 | Elomari |
| 7,531,707 | B2 | 5/2009 | Harris et al. |
| 2004/0077914 | A1 | 4/2004 | Zavilla et al. |
| 2004/0133056 | A1 | 7/2004 | Liu et al. |
| 2007/0249485 | A1 | 10/2007 | Elomari et al. |
| 2009/0163349 | A1 | 6/2009 | Elomari et al. |

OTHER PUBLICATIONS

Hickey et al, effect of hydrophobic coating on the behavior of a hygroscopic aerosol powder in an environment of controlled temperature and relative humidity, 1990, j. pharm sci, 79(11), pp. 1009-1014.*

* cited by examiner

*Primary Examiner* — Melvin Curtis Mayes
*Assistant Examiner* — Stefanie Cohen
(74) *Attorney, Agent, or Firm* — Steven H. Roth

(57) ABSTRACT

Methods and compositions for stabilizing the activity of catalytic compositions during catalytic processes, such as alkylation. A catalytic composition comprising a partially deactivated ionic liquid catalyst may be regenerated by reaction with a metal to form reactivated catalyst and an inorganic catalyst precursor; and the catalytic composition may be amended in-process by addition of an organic catalyst precursor for reaction with the inorganic catalyst precursor to form fresh ionic liquid catalyst. The organic catalyst precursor may be protected from water, e.g., during handling, by hydrophobic material(s).

17 Claims, No Drawings

METHODS AND COMPOSITIONS FOR STABILIZING CATALYTIC PROCESSES

FIELD OF THE INVENTION

The present invention relates to methods and compositions for stabilizing catalytic processes.

BACKGROUND OF THE INVENTION

Alkylation processes for the production of high octane gasoline cuts have been driven by the increasing demand for high quality and clean burning gasoline. Alkylate gasoline, which currently constitutes about 14% of the gasoline pool, is typically produced by alkylating isobutane with low-end olefins. Conventional alkylation processes use either sulfuric acid or hydrofluoric acid as catalyst, both of which have a number of drawbacks.

Disadvantages associated with the use of $H_2SO_4$ as an alkylation catalyst include the vast quantities of acid required to initially fill the reactor, and the large amounts of spent acid to be withdrawn on a daily basis for off-site regeneration, which involves incinerating the spent acid and preparing fresh acid. Disadvantages associated with the use of HF as an alkylation catalyst include the special handling requirements due to the highly corrosive nature of the acid, and the formation of aerosols, which presents an environmental and safety risk. These risks are evident from the additional safety measures associated with modern HF alkylation processes, such as water spray and catalyst additive for aerosol reduction.

Accordingly, catalyst systems that are safer and more environmentally friendly than HF and $H_2SO_4$ are required for refinery alkylation processes. However, thus far, no viable replacement catalyst systems have been commercialized, despite extensive research in both academic and industrial institutions.

Ionic liquids are liquids that are composed entirely of ions. Fused salt compositions are a class of ionic liquids that are liquid at low temperatures, with melting points often below room temperature. In general, such compositions have found applications as catalysts, solvents and electrolytes. The most common ionic liquids are those prepared from organic cations (ammonium, phosphonium, and sulphonium) and inorganic or organic anions. Anions of ionic liquids include $BF_4^-$, $PF_6^-$, haloaluminates such as $Al_2Cl_7^-$ and $Al_2Br_7^-$, $[(CF_3SO_2)_2N]^-$, alkyl sulfates ($RSO_3^-$), carboxylates ($RCO_2^-$). The most interesting ionic liquids for acid catalysis are those derived from organic halide salts and Lewis acids (such as $AlCl_3$, $TiCl_4$, $SnCl_4$, $FeCl_3$, etc). Chloroaluminate ionic liquids are perhaps the most commonly used ionic liquid catalyst systems for acid-catalyzed reactions.

Chloroaluminate ionic liquids can be prepared, for example, from an alkylpyridinium chloride or alkylimidazolium chloride and a metal halide. The use of the fused salts (1-alkylpyridinium chloride and aluminum trichloride) as electrolytes is discussed in U.S. Pat. No. 4,122,245. Other patents which discuss the use of fused salts as electrolytes include U.S. Pat. Nos. 4,463,071 and 4,463,072. Ionic liquids and their methods of preparation are also disclosed in U.S. Pat. Nos. 5,731,101; 6,797,853; 5,104,840 and in US Patent Application Publication Nos. 2004/0077914 and 2004/0133056.

During the past decade, the emergence of chloroaluminate ionic liquids has sparked some interest in $AlCl_3$-catalyzed alkylation in ionic liquids as a possible alternative to conventional catalysts. For example, the alkylation of isobutane with butenes and ethylene in ionic liquids has been described in U.S. Pat. Nos. 5,750,455; 6,028,024; and 6,235,959 and in the *Journal of Molecular Catalysis*, 92 (1994), 155-165; "*Ionic Liquids in Synthesis*", P. Wasserscheid and T. Welton (eds.), Wiley-VCH Verlag, 2003, pp 275). U.S. Pat. No. 7,531,707 to Harris et al. discloses a process for the alkylation of light isoparaffins with olefins using an ionic liquid catalyst and an alkyl halide promoter.

As a result of their use in catalytic reactions, ionic liquids become deactivated and may eventually need to be replaced. However, ionic liquid catalysts are expensive and replacement adds significantly to operating expenses by, in some cases, requiring shutdown of an industrial process. One of the heretofore unsolved problems impeding the commercialization of chloroaluminate ionic liquid catalysts has been the inability to effectively and efficiently regenerate and recycle them.

Recently, methods for ionic liquid catalyst regeneration were disclosed in US Patent Application Pub. No. 2007/0249485 (Elomari, et al.), in which spent ionic liquid catalyst, in combination with conjunct polymer, was reactivated by treatment with a regeneration metal. A consequence of this treatment is that excess metal halide may accumulate in the ionic liquid during catalyst regeneration. US Patent Application Pub. No. 2009/0163349 (Elomari, et al.), discloses the removal of excess metal halide from an ionic liquid catalyst by the addition of either an organic halide salt or a mixed salt, corresponding to the ionic liquid catalyst, having a metal halide/organic halide salt molar ratio less than two.

There is a need for methods for the regeneration of spent ionic liquid catalysts wherein the composition of the catalyst can be efficiently and economically maintained during and/or after catalyst regeneration. There is a further need for ionic liquid catalyzed alkylation processes wherein the catalytic activity and composition of the ionic liquid catalyst is stabilized in an economic and efficient manner.

SUMMARY OF THE INVENTION

The present invention is directed to methods for stabilizing catalytic activity and catalytic compositions during catalytic processes, such as hydrocarbon alkylation processes catalyzed by ionic liquid catalysts, wherein the catalysts may be prepared in-process from hygroscopic salts without introducing water into the catalytic compositions. The present invention is further directed to novel compositions comprising a hygroscopic catalyst precursor or component of an ionic liquid catalyst, wherein the hygroscopic catalyst precursor is protected from moisture by a water-resistant coating or water-impervious barrier material.

DETAILED DESCRIPTION OF THE INVENTION

In one embodiment, the present invention provides methods for stabilizing a catalytic composition, wherein a hygroscopic catalyst precursor is added, in-process, to the catalytic composition in an amount effective to control the catalytic activity of the catalytic composition, and wherein the catalyst precursor may be at least partially encapsulated within a hydrophobic material prior to the addition of the catalyst precursor to the catalytic composition.

The present invention also provides alkylation processes using an ionic liquid catalyst for alkylating an isoparaffin with an olefin in an alkylation zone in which the alkylate product is separated from the ionic liquid, and a portion of the ionic liquid is regenerated in a regeneration zone to provide reactivated catalyst and an "excess" of a metal halide, wherein an organic halide salt may be added to the regeneration zone for reaction with the excess metal halide to form the ionic liquid catalyst de novo. The organic halide salt may be referred to herein as a first catalyst precursor, and the metal halide may be referred to herein as a second catalyst precursor.

The present invention further provides compositions comprising a hygroscopic catalyst precursor for addition to the catalytic composition before, during, or after catalyst regeneration, or during an alkylation process that includes catalyst regeneration, wherein the catalyst precursor may be at least partially encapsulated within a hydrophobic material prior to the addition of the catalyst precursor to the catalytic composition.

Apart from environmental, health, and safety considerations, ionic liquid alkylation catalysts offer numerous advantages over conventional catalysts ($H_2SO_4$ and HF), including: lower capital expenditure as compared to $H_2SO_4$ and HF alkylation plants; lower operating expenditures as compared to $H_2SO_4$ alkylation plants; reduction in catalyst inventory volume (potentially by 90%); reduction in catalyst make-up rate (potentially by 98% compared to $H_2SO_4$ plants); higher gasoline yield; comparable or better product quality; expansion of alkylation feeds to include isopentane and ethylene; and higher catalyst activity and selectivity. Alkylation processes using ionic liquid catalysts are disclosed, for example, in commonly assigned U.S. Pat. No. 7,531,707 to Harris et al., the disclosure of which is incorporated by reference herein in its entirety.

As noted hereinabove, ionic liquid catalysts may become deactivated during use. For example, in an alkylate production unit, light (e.g., $C_2$-$C_5$) olefin and isoparaffin feeds may be contacted in the presence of a catalyst that promotes the alkylation reaction. In an embodiment of the present invention, the catalyst is a chloroaluminate ionic liquid. The reactor produces a biphasic mixture of alkylate hydrocarbons, unreacted isoparaffins, and ionic liquid catalyst containing some conjunct polymers. The more dense catalyst/conjunct polymer phase may be separated from the hydrocarbons by gravity settling in a decanter. This catalyst may be partially deactivated by the binding of the conjunct polymer to $AlCl_3$. The spent catalyst can be regenerated or reactivated by contact with a suitable regeneration metal, such as B, Al, Ga, In, Tl, Zn, Cd, Cu, Ag, Au, and mixtures thereof. The regeneration metal may be selected on the basis of the composition of the particular catalyst to prevent contamination of the catalyst with unwanted metal complexes or intermediates. For example, aluminum metal will be the metal of choice for the regeneration of chloroaluminate ionic liquid catalysts.

The products of the catalyst regeneration step include reactivated catalyst and removable conjunct polymers, among others, as described herein. The conjunct polymers can be separated from the reactivated ionic liquid catalyst, for example, by solvent extraction, decantation, and filtration. In one embodiment, a used ionic liquid catalyst/conjunct polymer mixture is introduced continuously into a regeneration reactor (or zone) containing a regeneration metal. Inert hydrocarbons, in which conjunct polymers are soluble, are fed into the reactor at the desired rate. The inert hydrocarbons may be a normal hydrocarbon ranging from $C_3$-$C_{15}$ or their mixtures, and usually $C_4$-$C_8$. The residence time, temperature, and pressure of the reactor will be selected to allow the desired reactivation of the ionic liquid catalyst.

The reaction product is withdrawn and sent to a separator to provide two streams: one comprising inert hydrocarbons together with removable conjunct polymers, and the other stream comprising regenerated ionic liquid catalyst. A gravity decanter may be used to separate the mixture, from which the more dense ionic liquid phase is withdrawn. The reactivated ionic liquid catalyst may be returned to the alkylation reactor. The solvent/conjunct polymer mix may be distilled to recover the solvent. Various modifications of this process are also within the scope of the present invention.

During the regeneration of, for example, a spent chloroaluminate ionic liquid catalyst using aluminum metal, aluminum trichloride is produced as part of the regeneration chemistry. Aluminum trichloride is a solid which can precipitate and accumulate in the regeneration zone or other parts of the system. Using 1-butylpyridinium chloroaluminate as a non-limiting example of an ionic liquid catalyst, a suitable $AlCl_3$/1-butylpyridinium chloride molar ratio is two. In order to stabilize processes of the present invention by using a regulated catalyst inventory, it is necessary to effectively manage the "excess" aluminum trichloride formed during catalyst regeneration.

As noted hereinabove, metal halide formed during ionic liquid catalyst regeneration can be accommodated by the addition of either i) the corresponding organic halide catalyst precursor (a hygroscopic solid), or ii) a mixed salt (ionic liquid) corresponding to the ionic liquid catalyst but having a (lower) metal halide/organic halide salt molar ratio less than two (the ionic liquid catalyst itself has a metal halide/organic halide salt molar ratio of two). Handling a hygroscopic solid (organic halide catalyst precursor) (option i)) is generally less convenient and less inefficient than handling an ionic liquid (option ii). However, in order to obtain a desired metal halide/organic halide salt molar ratio of two (2) using an ionic liquid mixed salt make-up stream having a metal halide/organic halide salt molar ratio of, e.g., 1.8, would require a large volume of the regenerated catalyst to be replaced with the make-up stream. Such a scheme, involving the removal and replacement of large volumes of ionic liquid, is very inefficient, expensive, and wasteful. From a theoretical standpoint, reacting the excess metal halide with the organic halide catalyst precursor is a much more efficient mechanism for restoring the desired metal halide/organic halide salt molar ratio. However, in practice, handling a hygroscopic salt, which rapidly accumulates atmospheric moisture to form a sticky paste or solution, is problematic. Even using a lock hopper under inert atmosphere for adding the hygroscopic solid (organic halide catalyst precursor), the solid would still be exposed to air when the lock hopper was loading, and this presents the likelihood of water accumulation by the solid and the introduction of water into the catalyst system.

According to one aspect of the present invention, the addition of (a hygroscopic) organic halide catalyst precursor for accommodating the "excess" metal halide may be enabled by preventing water uptake by the catalyst precursor prior to addition of the catalyst precursor to the catalytic composition. In an embodiment, water uptake by the catalyst precursor can be prevented by a hydrophobic coating material disposed on the catalyst precursor prior to addition of the catalyst precursor to the catalytic composition.

In an embodiment, the organic halide catalyst precursor (e.g., 1-butylpyridinium chloride) may be added to the catalyst composition after treatment of the catalytic composition with the regeneration metal. In this case, the amount of metal halide (e.g., $AlCl_3$) produced during regeneration of the ionic liquid catalyst can be quantified by measuring the consumption of Al metal; then, an amount of organic halide catalyst precursor needed to react with the excess aluminum trichloride can be determined. In another embodiment, the organic halide catalyst precursor may be added to the catalyst composition prior to, or concurrently with, treatment of the catalytic composition with the regeneration metal. Regardless of when the catalyst precursor is added to the catalytic composition, the metal halide (e.g., $AlCl_3$) may combine with the added organic halide catalyst precursor in the de novo formation of the ionic liquid (e.g., chloroaluminate) catalyst.

A first catalyst precursor, to be added to a catalytic composition during or after catalyst regeneration, may comprise a hydrocarbyl, e.g., alkyl, substituted pyridinium halide, imidazolium halide, tetraalkylammonium halide, or trialkylammonium hydrohalide. As an example, the first catalyst precursor may be a salt of the general formulas A, B, C, and D:

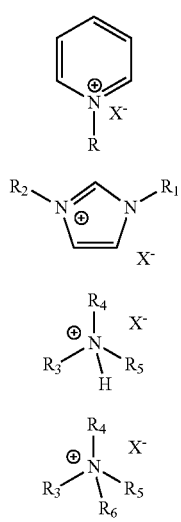

wherein X is halide, each of R, $R_1$, and $R_2$=H, methyl, ethyl, propyl, butyl, pentyl or hexyl, wherein $R_1$ and $R_2$ may or may not be the same; and each of $R_3$, $R_4$, $R_5$, and $R_6$=methyl, ethyl, propyl, butyl, pentyl or hexyl, wherein $R_3$, $R_4$, $R_5$, and $R_6$ may or may not be the same.

The first catalyst precursor may be a hygroscopic solid, such as an alkyl substituted pyridinium halide or an alkyl substituted imidazolium halide. Accordingly, absent the present invention, the first catalyst precursor may be difficult or impossible to handle per se without risking water uptake by the catalyst precursor and the introduction of water into the catalyst system. According to one aspect of the present invention, a hydrophobic coating may be disposed on at least a portion of the first catalyst precursor prior to addition of the first catalyst precursor to the catalytic composition in the regeneration zone. Typically, the hydrophobic coating may completely surround, or encapsulate, the first catalyst precursor. The hydrophobic coating may be selected to repel water and to decrease or eliminate water adsorption by the catalyst precursor.

In an embodiment, the hydrophobic coating may comprise a wax, an oil, a resin, or a polymer, and the like. Hydrophobic materials that may be suitable for coating the first catalyst precursor include, without limitation, petroleum-derived waxes (paraffin wax), as well as waxes derived from plants, insects, or other organisms; mineral oils, as well as various vegetable oils, and the like; natural and synthetic resins; and natural or synthetic polymers, or their derivatives, and mixtures thereof. In an embodiment, the hydrophobic coating may comprise a material that lacks a Lewis base group, e.g., carbonyl, such as a saturated wax or paraffin. The invention is not limited to any particular hydrophobic coating material(s).

In an embodiment of the present invention, the first catalyst precursor may be added to the catalytic composition (e.g., in the regeneration zone) while the catalyst precursor is coated with the hydrophobic material. In other embodiments, the hydrophobic material may be at least partially removed from the catalyst precursor prior to addition of the catalyst precursor to the catalytic composition, e.g., just prior to addition of the catalyst precursor to the regeneration zone from a lock hopper under an inert atmosphere.

In an embodiment, the hydrophobic coating may comprise a material that is at least partially removed from the catalyst precursor when the coated catalyst precursor is exposed to process conditions, such as catalyst regeneration conditions. In one embodiment, the coating may be removed from the catalyst precursor by melting the hydrophobic material.

In an embodiment, the hydrophobic material/coating on the first catalyst precursor may comprise a wax selected for having a melting point within a particular temperature range. For example, the melting point of the hydrophobic material may be selected according to the conditions to which a coated catalyst precursor may be exposed before, during, or after catalyst regeneration. The melting point of the hydrophobic material may also be selected, in part, according to the conditions under which the coated catalyst precursor, e.g., coated granules of catalyst precursor, is to be stored and/or transported. In an embodiment, the hydrophobic material may have a melting point less than about 125° C., and typically less than about 100° C. In another embodiment, the hydrophobic material may have a melting point in the range from about 40° C. to about 95° C.

In an embodiment, the hydrophobic coating may comprise a $C_{16}$-$C_{30}$ paraffin wax. The hydrophobic coating may melt under catalyst regeneration conditions, and the hydrophobic material may be subsequently extracted from an ionic liquid catalytic composition, e.g., using a $C_3$-$C_{15}$ hydrocarbon. In an embodiment, the hydrophobic coating material may be extracted from a regeneration reactor, together with conjunct polymer, e.g., using butanes from a debutanizer.

In an embodiment, the first catalyst precursor may be coated with the hydrophobic coating by a) suspending dry catalyst precursor in molten hydrophobic material to form an aggregate material, and b) forming the aggregate material into a suitable shape. For example, the molten hydrophobic material, with suspended catalyst precursor therein, may be allowed to solidify prior to extrusion of encapsulated catalyst precursor.

In another embodiment, the dried catalyst precursor (anhydrous) may be pelletized, i.e., formed into a pellet, granule, or the like, prior to the application of hydrophobic coating material thereto. In an embodiment, pellets of the catalyst precursor may be coated with wax to provide moisture resistant granules of the catalyst precursor. The hydrophobic coating may be applied to pellets of the catalyst precursor by spraying the coating on each of the pellets. Alternatively, the hydrophobic coating may be applied to the catalyst precursor by dipping each of the pellets in molten hydrophobic coating material. Other methods for applying hydrophobic materials to the first catalyst precursor are also within the scope of the present invention.

In an embodiment, coated pellets or granules of catalyst precursor may further comprise an additive such as a flow agent and/or an anti-caking agent, for example, to improve the handling characteristics (e.g., flowability) of the coated pellets. The pellets of catalyst precursor may be at least substantially uniform in size and/or shape. Such uniformity in size and/or shape may simplify handling, storage, and transportation of the granules. Coated pellets or granules comprising catalyst precursor may be formed into various shapes, for example, rounded, flattened, spheroidal, disc-like, cylindrical, pyramidal, amorphous, square, oblong, or irregular in shape.

As noted hereinabove, the catalyst precursor may be hygroscopic and the hydrophobic coating may effectively prevent the uptake of water by the catalyst precursor during storage and/or prior to use of the coated catalyst precursor. As a non-limiting example, the hydrophobic coating may prevent any substantial uptake of water by the catalyst precursor when the coated catalyst precursor is exposed for a period of at least 5 days to conditions, e.g., storage conditions, including a temperature up to about 40° C. and up to about 95% relative humidity.

According to one aspect of the present invention, there is provided a method for stabilizing a catalytic composition comprising an ionic liquid. In an embodiment, the ionic liquid catalyst may comprise a chloroaluminate ionic liquid catalyst, e.g., for catalyzing the alkylation of an isoparaffin with an olefin. A method for stabilizing a catalytic composition may be performed in-process, e.g., during or as part of a catalyst regeneration process or an alkylation process. The term "in-process" may be used herein to refer to one or more steps, acts, or reactions that occur during a process of which the step(s), act(s), or reaction(s) may be a part, or in which the step(s), act(s), or reaction(s) may be involved.

In an embodiment, a method for stabilizing a catalytic composition may involve the addition of a hygroscopic first catalyst precursor to a catalytic composition in an amount effective to control or manage the catalytic activity of the catalytic composition. The first catalyst precursor may comprise an organic halide salt that reacts with the second catalyst precursor (metal halide) to form new ionic liquid catalyst. The first catalyst precursor may be added to the catalytic composition before, during, or after regeneration of the catalytic composition, e.g., before, during, or after treatment of the catalytic composition with regeneration metal, as described hereinabove. In an embodiment, the regeneration metal may comprise Al metal, e.g., substantially as described in commonly assigned U.S. patent application Ser. Nos. 11/408,336 and 11/960,319 (US Pub. Nos. 2007/0249485 and 2009/0163349, respectively), the disclosures of which are incorporated by reference herein in their entirety.

During regeneration of the ionic liquid catalyst by treatment with Al metal, "excess" $AlCl_3$ may be formed, e.g., by reaction of Al with the chlorine-containing conjunct polymer component of the spent catalyst. In order to stabilize the catalyst composition and to control the catalytic activity of the ionic liquid, the $AlCl_3$ may be "removed" by adding the organic halide catalyst precursor, thereby forming fresh ionic liquid catalyst. That is to say, during processes for catalyst stabilization according to the present invention, an additional quantity of the ionic liquid catalyst may be formed de novo. The additional ionic liquid catalyst thus formed may be fed to the alkylation zone, or the additional ionic liquid catalyst may be stored for future use.

According to one aspect of the present invention, the first catalyst precursor is at least partially encapsulated within a hydrophobic material prior to the addition of the catalyst precursor to the catalytic composition. In an embodiment, the catalyst precursor may be coated with the hydrophobic material at the time of addition of the catalyst precursor to the catalytic composition. For example, catalyst precursor that has been coated with the hydrophobic material may be added to the catalyst composition in the regeneration zone under regeneration conditions that are conducive to removal of the hydrophobic coating from the catalyst precursor. In an embodiment, the regeneration zone may be at a temperature equal to or greater than ($\geqq$) the melting point of the hydrophobic material. In a non-limiting example, the hydrophobic material may have a melting point less than 60° C., and the regeneration conditions may include a temperature of at least 90° C. Hydrophobic coating materials and coated catalyst precursor compositions suitable for use in methods and processes of the present invention are described hereinabove. As an example, the first catalyst precursor may comprise a salt of the general formulas A, B, C, and D, supra, and the first catalyst precursor may be coated with a wax or an oil, and the like.

An ionic liquid catalyst for alkylation processes according to the present invention may be prepared by contacting the first catalyst precursor (an organic halide salt) with a metal halide. The organic halide salt may be referred to herein as the first (or organic) catalyst precursor, and the metal halide may be referred to as the second (or inorganic) catalyst precursor. The organic halide salt may be, for example, an alkylpyridinium chloride or an alkylimidazolium chloride, and the metal halide may be, for example, aluminum trichloride ($AlCl_3$). The ionic liquid catalyst may be prepared by combining the organic halide salt with $AlCl_3$ in an $AlCl_3$/organic halide salt molar ratio of two. In a particular non-limiting example, an ionic liquid catalyst of the invention may comprise 1-butylpyridinium heptachloroaluminate (see, for example, commonly assigned U.S. Pat. No. 7,495,144, the disclosure of which is incorporated by reference herein in its entirety).

In an embodiment, the first catalyst precursor is added to the excess $AlCl_3$/regenerated catalytic composition in an amount sufficient to provide an $AlCl_3$/organic catalyst precursor molar ratio of about two, such that at least substantially all of the $AlCl_3$ formed during catalyst regeneration is consumed in forming fresh ionic liquid catalyst. Any hydrophobic material released from the coated catalyst precursor into the ionic liquid may be removed, for example, together with conjunct polymer released during catalyst regeneration, by extraction of the catalyst composition with one or more hydrocarbons, e.g., a $C_3$-$C_{15}$ hydrocarbon or their mixtures, and typically $C_4$-$C_8$, in which the hydrophobic material (and conjunct polymer) are soluble.

As a non-limiting example, a process according to an embodiment of the present invention may involve separating a partially spent ionic liquid catalyst from a hydrocarbon phase containing an alkylate product. A first portion of the partially spent catalyst may be returned to the alkylation zone to participate in further alkylation reactions. A second portion of the partially spent catalyst may be fed to a regeneration zone for regenerating the partially spent ionic liquid catalyst. The partially spent catalyst may include a certain amount of conjunct polymer bound to the ionic liquid. In the regeneration zone, the partially spent catalyst may be contacted with a regeneration metal under regeneration conditions to provide a catalytic composition comprising i) reactivated ionic liquid catalyst and ii) free conjunct polymer, wherein $AlCl_3$ is formed by reaction of the regeneration metal with the partially spent catalyst. By "free conjunct polymer" is meant conjunct polymer that has been released from spent catalyst (e.g., by reaction with Al metal), and/or conjunct polymer that can be readily extracted from the ionic liquid phase using hydrocarbon solvents. The $AlCl_3$ formed during catalyst regeneration may be contacted with the added first catalyst precursor to form fresh ionic liquid catalyst. Substantially all of the $AlCl_3$ formed during catalyst regeneration may react with the first catalyst precursor when the latter is added to the catalytic composition in an amount sufficient to provide an $AlCl_3$/first catalyst precursor molar ratio of about two.

Prior to the addition of the first catalyst precursor to the catalytic composition, the catalyst precursor may be coated with a hydrophobic material sufficient to prevent moisture uptake by the catalyst precursor. The invention is not limited to addition of the first catalyst precursor to the catalytic composition at any particular point or stage of the regeneration reaction or process. For example, an organic halide catalyst precursor may be added to the catalytic composition prior to, concurrently with, or subsequent to treatment of the catalytic composition with the regeneration metal.

The present invention further provides an alkylation process for the production of high quality gasoline blending agents, e.g., from refinery process streams. In an embodiment, a process for forming an alkylate may comprise contacting under alkylation conditions at least one $C_2$ to $C_6$ olefin and at least one $C_3$ to $C_6$ isoparaffin with an ionic liquid catalytic composition prepared from a hygroscopic first catalyst precursor, wherein the first catalyst precursor is added in-process to the catalytic composition and the catalyst precursor is at least partially coated with a hydrophobic material prior to addition of the catalyst precursor to the catalytic composition. The catalytic composition may comprise an acidic ionic liquid catalyst. In an embodiment, the ionic liquid may comprise a chloroaluminate prepared by contacting the first (organic) catalyst precursor with the second (inorganic) catalyst precursor, substantially as described hereinabove or as described in Example 1 (infra). The catalytic composition may further comprise an alkyl halide and an HCl co-catalyst.

As a non-limiting example, the ionic liquid catalyst may be prepared by contacting 1-butylpyridinium (first catalyst precursor) with $AlCl_3$ (second catalyst precursor) in an $AlCl_3$/first catalyst precursor molar ratio of two, to form 1-butylpyridinium heptachloroaluminate. Other examples of acidic ionic liquid catalysts which may be useful in practicing the present invention include 1-butyl-4-methylpyridinium chloroaluminate, 1-butyl-3-methyl-imidazolium chloroaluminate, and 1-H-pyridinium chloroaluminate. Of course, the invention in not limited to any particular ionic liquid catalysts.

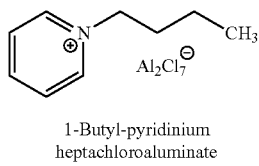

1-Butyl-pyridinium
heptachloroaluminate

The alkylation process may include a regeneration zone for the in-process reactivation of at least a portion of a spent or partially spent ionic liquid catalyst. For example, a portion of the catalytic composition may be fed, in-process, to the regeneration zone. The catalyst composition in the regeneration zone may be regenerated by treatment with Al metal to provide reactivated ionic liquid catalyst together with an excess of $AlCl_3$, and the first catalyst precursor may be added to the catalytic composition in an amount sufficient to provide an $AlCl_3$/first catalyst precursor molar ratio of about two. The catalyst precursor may be coated with a hydrophobic material prior to addition of the catalyst precursor to the catalytic composition. In an embodiment, the regeneration conditions may be conducive to the removal of the hydrophobic material from the catalyst precursor, e.g., the temperature in the regeneration zone may be equal to or greater than ($\geqq$) the melting point of the hydrophobic material. The hydrophobic material may have a melting point in the range from about 35° C. to about 125° C., typically from about 40° C. to about 95° C., and usually from about 45° C. to about 80° C.

The isoparaffins for the alkylation reaction may include, e.g., isobutane, isopentanes, and mixtures thereof and the olefins may include, e.g., ethylene, propylene, butylenes, pentenes, and mixtures thereof. Alkylation conditions may include a temperature of from 50° C. to 100° C., a pressure of from 300 kPA to 2500 kPa, an isoparaffin to olefin molar ratio of from 2 to 8, and a residence time of from 1 minute to 1 hour. The ionic liquid catalyst composition may include a promoter, such as a $C_2$-$C_6$ alkyl halide, and the catalytic composition may further include an HCl co-catalyst.

As a non-limiting example, in an alkylation process of the present invention, at least one $C_2$ to $C_6$ olefin and at least one $C_3$ to $C_6$ isoparaffin may be contacted in an alkylation zone under alkylation conditions with an ionic liquid catalyst to provide an alkylate. The ionic liquid catalyst may be prepared from a hygroscopic first catalyst precursor, such as salts of the general formulas A, B, C, and D (supra). In a subsequent step, the hydrocarbon phase containing the alkylate may be separated from an ionic liquid phase comprising partially spent catalyst. At least a portion of the partially spent catalyst may be treated with a regeneration metal to provide a reactivated catalytic composition with the concomitant formation of a metal halide (e.g., $AlCl_3$), and the metal halide thus formed is contacted with an additional amount of the first catalyst precursor.

In an embodiment where the first catalyst precursor is added to the catalytic composition before or concurrently with the regeneration metal, the metal halide formed during catalyst regeneration may react with the catalyst precursor in situ to form new ionic liquid catalyst. In other embodiments where the catalyst precursor is added to the catalytic composition after treatment with the regeneration metal, excess metal halide may accumulate in the catalytic composition. Accordingly, an amount of the catalyst precursor may be added to the reactivated catalytic composition sufficient to react with the excess metal halide to form new ionic liquid catalyst. In an embodiment, sufficient of the catalyst precursor may be added to the reactivated catalytic composition so as to remove at least substantially all of the excess metal halide.

As noted hereinabove, the first- or organic catalyst precursor may be coated with one or more hydrophobic materials prior to the addition of the catalyst precursor to the reactivated catalytic composition. In an embodiment, the catalyst precursor may be added under regeneration conditions sufficient to remove the hydrophobic coating material from the first catalyst precursor. The hydrophobic coating on the catalyst precursor serves as an effective water barrier, simplifies handling of the catalyst precursor, and prevents the introduction of water into the catalyst system.

EXAMPLES

The following Examples are illustrative of the present invention, but are not intended to limit the invention in any way beyond what is contained in the claims which follow.

Example 1

Preparation of 1-Butylpyridinium Chloroaluminate Ionic Liquid Catalyst 1-butylpyridinium chloroaluminate is a room temperature ionic liquid prepared by mixing neat 1-butylpyridinium chloride (a solid) with neat solid aluminum trichloride in an inert atmosphere. 1-butylpyridinium chloride and the corresponding 1-butylpyridinium chloroaluminate were synthesized as follows. In a 2-L Teflon-lined autoclave, 400 gm (5.05 mol.) of anhydrous pyridine (99.9% pure, Aldrich) were mixed with 650 gm (7 mol.) of 1-chlorobutane (99.5% pure, Aldrich). The neat mixture was sealed and stirred at 125° C. under autogenic pressure overnight. After cooling and venting the autoclave, the reaction mix was diluted and dissolved in chloroform and transferred to a 3-L round bottom flask. Concentration of the reaction mixture at reduced pressure on a rotary evaporator (in a hot water bath) to remove excess chloride, unreacted pyridine, and the chloroform solvent gave a tan solid product. Purification of the product was done by dissolving the obtained solids in hot acetone and precipitating the pure product through cooling and addition of diethyl ether. Filtering and drying under vacuum and heat on a rotary evaporator gave 750 gm (88% yields) of the desired product as an off-white shiny solid. $^1$H- and $^{13}$C-NMR were consistent with the desired 1-butylpyridinium chloride, and no impurities were observed.

1-butylpyridinium chloroaluminate was prepared by slowly mixing dried 1-butylpyridinium chloride and anhydrous aluminum trichloride ($AlCl_3$) according to the following procedure. The 1-butylpyridinium chloride was dried under vacuum at 80° C. for 48 hours to remove residual water (1-butylpyridinium chloride is hygroscopic and readily absorbs water upon exposure to air). Five hundred grams (2.91 mol.) of the dried 1-butylpyridinium chloride were transferred to a 2-L beaker in a nitrogen atmosphere in a glove box. Then, 777.4 gm (5.83 mol.) of anhydrous powdered $AlCl_3$ (99.99%, Aldrich) were added in small portions (while stirring) to control the temperature of the highly exothermic reaction. Once all the $AlCl_3$ was added, the resulting amber-looking liquid was left to gently stir for an additional ½-1 hour. The liquid was then filtered to remove any un-dissolved $AlCl_3$. The resulting acidic 1-butylpyridinium chloroaluminate was used as the catalyst for the alkylation of isoparaffins with olefins.

Example 2

Preparation of Deactivated Ionic Liquid Catalyst

Deactivated or "used" ionic liquid catalyst was prepared from 1-butylpyridinium chloroaluminate ionic liquid catalyst (Example 1) by performing isobutane alkylation in a continuous flow microunit under catalyst recycle with accelerated fouling conditions.

The microunit consists of feed pumps for isobutane and butenes, a stirred autoclave reactor, a back pressure regulator, a three phase separator, and a third pump to recycle the separated ionic liquid catalyst back to the reactor. The reactor was operated at 80 to 100 psig pressure and with cooling to maintain a reaction temperature of ca. 10° C. To start the reaction, isobutane, butenes, and HCl were pumped into the autoclave at the desired molar ratio (isobutane/butenes>1.0), through the back pressure regulator, and into the three phase separator. At the same time, the chloroaluminate ionic liquid catalyst (Example 1) was pumped into the reactor at a rate pre-calculated to give the desired catalyst/feed ratio on a volumetric basis. As the reaction proceeded, ionic liquid separated from the reactor effluent and collected in the bottom of the three phase separator. When a sufficient level of catalyst had accumulated in the bottom of the separator, the flow of fresh ionic liquid was stopped and catalyst recycling from the bottom of the separator was started. In this way, the initial catalyst charge was continually used and recycled in the process. The process conditions were as follows: isobutane pump rate 4.6 g/min; butene pump rate 2.2 g/min; catalyst pump rate 1.6 g/min; HCl flow rate 3.0 SCCM; pressure 100 psig; temperature 10° C. The reaction was continued for 72 hours when it was judged that the catalyst had become sufficiently deactivated.

Example 3

Quantification of Conjunct Polymer and Olefin Oligomers in Deactivated Catalyst

The wt % of conjunct polymers in the spent (deactivated) ionic liquid catalyst was determined by hydrolysis of known weights of the spent catalyst (prepared in Example 2). In a glove box, 15 gm of spent ionic liquid catalyst in a flask were rinsed first with 30-50 ml of anhydrous hexane to remove any residual hydrocarbon or olefinic oligomers from the spent catalyst. The hexane rinse was concentrated under reduced pressure to give only 0.02 gm of yellow oil (0.13%). Then, 50 ml of anhydrous hexane was added to the rinsed catalyst followed by the slow addition of 15 ml of water, and the mixture was stirred at 0° C. for 15-20 minutes. The resulting mixture was diluted with an additional 30 ml of hexanes and stirred well for an additional 5-10 minutes. The mixture was allowed to settle into two layers together with some solid residue. The organic layer was recovered by decanting. The aqueous layer was further washed with an additional 50 ml of hexanes. The hexanes layers were combined and dried over anhydrous $MgSO_4$, filtered and concentrated to give 2.5 gm (16.7 wt % of the spent catalyst) of viscous dark orange-reddish oil. It was determined therefore that this particular spent catalyst contains 0.13% oligomers and 16.7% conjunct polymers. The hydrolysis can also be accomplished using acidic (aqueous HCl) or basic (aqueous NaOH) solutions.

Example 4

Characterization of Conjunct Polymer Recovered from Deactivated Catalyst

The conjunct polymers recovered according to Example 3 were characterized by elemental analysis and by infrared (IR), NMR, GC-MS, and UV spectroscopy. The recovered conjunct polymers have a hydrogen/carbon ratio of 1.76 and a chlorine content of 0.8%. $^1$H- and $^{13}$C-NMR spectroscopy showed the presence of olefinic protons and olefinic carbons. IR spectroscopy indicated the presence of olefinic regions and the presence of cyclic systems and substituted double bonds. GC-MS analysis showed the conjunct polymers to have molecular weights ranging from 150-mid 600s. The recovered conjunct polymers have boiling ranges of 350-1100° F., as indicated by high boiling simulated distillation analysis. UV spectroscopy showed an absorption peak ($\lambda_{max}$) at 250 nm pointing to the presence of highly conjugated double bond systems.

Example 5

Catalyst Regeneration by Removal of Conjunct Polymers Using Al Metal

A 300 cc autoclave was charged with 51 gm of used (deactivated) 1-butylpyridinium chloroaluminate ionic liquid containing 15.5 wt % (7.90 gm) conjunct polymers, 65 ml of hexane, and 8 gm of aluminum powder. The autoclave was heated to 100° C. while stirring with an overhead stirrer at 1200 rpm. The starting autogenic pressure of the reaction was 11 psi and rose to 62 psi (at 100° C.) and remained there for the duration of the reaction. The reaction was allowed to run for 1.5 hrs. The reaction was cooled down, and the reaction mixture was separated in a glove box where the hexane layer was removed by decantation. The ionic liquid/Al metal residue was rinsed twice (2x) with 50 ml of anhydrous hexane. The hexane layers were all combined and dried over $MgSO_4$. Filtration and concentration of the dried hexane rinses gave 6.3 gm (99.7%) of the expected conjunct polymers as pale yellow oils. The ionic liquid catalyst was separated from aluminum by filtration. Hydrolysis of a 10 gm portion of the filtered ionic liquid catalyst, followed by extraction with hexane, showed no presence of conjunct polymers in the treated spent ionic liquid.

The reaction described above was repeated using the same sample of spent catalyst, resulting in the removal of >98% of the conjunct polymers. The reaction was repeated on 52 gm of spent butylpyridinium chloroaluminate catalyst containing 15.5 wt % (7.9 gm) of conjunct polymer, resulting in the removal of 7.75 gm (98.0%) of the conjunct polymers from the spent catalyst. Hydrolysis of the regenerated ionic liquid catalyst indicated the presence of <0.5% of conjunct polymers.

Example 6

Catalyst Regeneration Using Zn, In, or Ga Metal

The catalyst regeneration procedure of Example 5 was repeated using either excess zinc, indium, or gallium metal (8 grams in each case) instead of Al metal to regenerate spent ionic liquid (ca. 50 gm in each case) containing 24.3 wt % conjunct polymers. The reactions ran for 1.5 hours at 100° C., after which treatment with Zn, In, and Ga was found to provide 81%, 89%, and 45% removal, respectively, of the conjunct polymers present in the spent catalyst.

Example 7

Regeneration of Spent Catalyst Prior to Addition of Catalyst Precursor

Spent catalyst containing conjunct polymer was regenerated with Al metal prior to the addition of organic catalyst precursor (1-butylpyridinium chloride) as follows. A 300 cc autoclave equipped with an overhead stirrer was charged with 100 gm of spent ionic liquid containing 24 wt % conjunct polymers, 8 gm of aluminum powder, and 60 gm of n-hexane. The autoclave was sealed, heated to 100° C., and allowed to stir at maximum speed (ca. 1600 rpm) for 90 minutes. Then, the reaction was cooled to room temperature. The reaction mixture was allowed to settle and the hydrocarbon (top) layer was decanted. The ionic liquid layer together with the Al metal powder was rinsed twice with anhydrous n-hexane and all of the hexane fractions were combined and the hexane removed to recover the conjunct polymers. The ionic liquid layer containing the Al metal was filtered in a glove box (inert atmosphere) to separate the regenerated ionic liquid catalyst from the Al metal.

The regenerated ionic liquid catalyst, 65 gm, appeared as a transparent amber solution. This ionic liquid catalyst was allowed to stand at room temperature for a few hours, after which it turned from transparent to opaque. After standing at room temperature overnight, the ionic liquid became transparent with the appearance of an $AlCl_3$ precipitate at the bottom. To this solution, 1 gm of 1-butylpyridinium chloride was added to react with the precipitated $AlCl_3$ and the mixture was stirred for a few minutes at room temperature. The $AlCl_3$ precipitate disappeared, and after standing at room temperature over the weekend no further precipitation occurred nor did the ionic liquid lose its transparency. The added 1-butylpyridinium chloride reacted with the excess $AlCl_3$ to form additional ionic liquid catalyst.

Example 8

Regeneration of Spent Catalyst in the Presence of Catalyst Precursor

A 300 cc autoclave equipped with an overhead stirrer was charged with 100 gm of spent ionic liquid containing 24 wt % conjunct polymers, 8 gm of aluminum powder, 1.5 gm of 1-butylpyridinium chloride, and 60 gm of n-hexane. As in Example 7, the autoclave was sealed, heated to 100° C., and allowed to stir at maximum speed (ca. 1600 rpm) for 90 minutes, after which the reaction was cooled to room temperature. Again as in Example 7, the reaction mixture was allowed to settle and the hydrocarbon (top) layer was separated from the ionic liquid and Al metal by decanting the top layer. The ionic liquid layer with the Al powder was rinsed twice with anhydrous n-hexane and all of the hexane fractions were combined, and then the hexane was removed to recover the conjunct polymers. The ionic liquid layer containing the Al powder was filtered in a glove box (inert atmosphere) to separate the regenerated ionic liquid catalyst from the Al metal. The resulting regenerated ionic liquid catalyst, 68 gm, appeared as a transparent amber solution. Unlike the regenerated catalyst obtained in Example 7, the catalyst did not become opaque on standing at room temperature for several days, and no $AlCl_3$ precipitate was observed after standing at room temperature for two weeks. The inclusion of 1-butylpyridinium chloride from the start of the regeneration process allowed the 1-butylpyridinium chloride to interact in situ with the $AlCl_3$ produced by catalyst regeneration to form new ionic liquid catalyst.

Numerous variations of the present invention may be possible in light of the teachings and examples herein. It is therefore understood that within the scope of the following claims, the invention may be practiced otherwise than as specifically described or exemplified herein.

What is claimed is:

1. A method for stabilizing a catalytic composition, the method comprising: the in-process addition of a hygroscopic catalyst precursor to the catalytic composition in an amount effective to control the catalytic activity of the catalytic composition, wherein the catalyst precursor is at least partially encapsulated within a hydrophobic material prior to the addition of the catalyst precursor to the catalytic composition, wherein the hygroscopic catalyst precursor is selected from the group consisting of compounds of formulas A, B, C, and D:

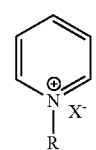

A

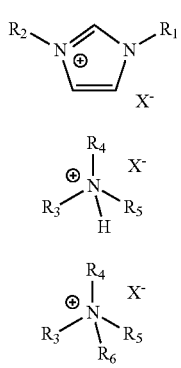

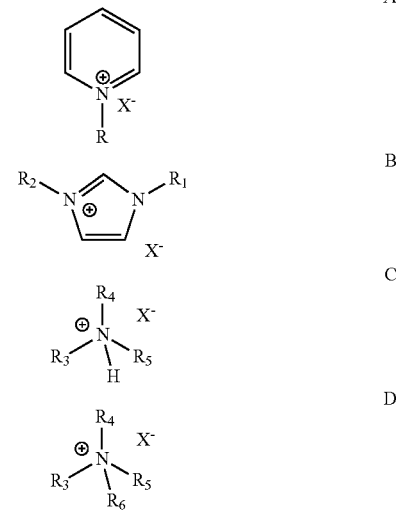

wherein X is halide, each of R, R1, and R2=H, methyl, ethyl, propyl, butyl, pentyl or hexyl, wherein R1 and R2 may or may not be the same; and each of R3, R4, R5, and R6=methyl, ethyl, propyl, butyl, pentyl or hexyl, wherein R3, R4, R5, and R6 may or may not be the same, and wherein the hydrophobic material is selected from the group consisting of a wax, an oil, a resin, and a polymer.

2. The method according to claim 1, wherein the catalytic composition comprises an acidic ionic liquid catalyst.

3. The method according to claim 2, wherein the ionic liquid catalyst is prepared by contacting the catalyst precursor with aluminum trichloride ($AlCl_3$) in an $AlCl_3$/catalyst precursor molar ratio of about 2.

4. The method according to claim 1, wherein the catalytic composition contains an excess of aluminum trichloride, and the catalyst precursor is added to the catalytic composition in an amount sufficient to provide an $AlCl_3$/catalyst precursor molar ratio of about 2.

5. The method according to claim 1, wherein the catalyst precursor is pelletized to form pellets of the catalyst precursor, and the pellets are coated with the hydrophobic material to provide moisture resistant granules of the catalyst precursor.

6. The method according to claim 5, wherein the granules of catalyst precursor comprise a pelletized 1-alkylpyridinium chloride coated with wax.

7. The method according to claim 1, wherein the catalyst precursor is added to the catalytic composition under conditions sufficient to at least partially remove the hydrophobic material from the catalyst precursor.

8. The method according to claim 1, wherein the hydrophobic material has a melting point less than about 100° C.

9. The method according to claim 1, wherein the hydrophobic material is soluble in $C_3$ to $C_{15}$ hydrocarbons.

10. The method according to claim 1, wherein the hydrophobic material comprises a paraffin wax.

11. A method for stabilizing a catalytic composition, the method comprising: adding a first catalyst precursor to a catalyst regeneration zone; and forming an ionic liquid catalyst de novo in the regeneration zone by contacting the first catalyst precursor with a second catalyst precursor, wherein the first catalyst precursor is coated with a hydrophobic material prior to the addition of the first catalyst precursor to the regeneration zone, wherein the first catalyst precursor is selected from the group consisting of compounds of formulas A, B, C, and D:

wherein X is halide, each of R, R1, and R2=H, methyl, ethyl, propyl, butyl, pentyl or hexyl, wherein R1 and R2 may or may not be the same; and each of R3, R4, R5, and R6=methyl, ethyl, propyl, butyl, pentyl or hexyl, wherein R3, R4, R5, and R6 may or may not be the same, and wherein the hydrophobic material is selected from the group consisting of a wax, an oil, a resin, and a polymer.

12. The method according to claim 11, wherein the second catalyst precursor is formed in the regeneration zone by treating a spent catalyst with a regeneration metal.

13. The method according to claim 11, wherein the second catalyst precursor comprises $AlCl_3$, and the first catalyst precursor is added to the catalytic composition in an amount sufficient to provide an $AlCl_3$/first catalyst precursor molar ratio of about 2.

14. The method according to claim 11, wherein the regeneration zone is at a temperature equal to or greater than the melting point of the hydrophobic material.

15. The method according to claim 11, wherein the hydrophobic material comprises a paraffin wax having a melting point in the range from about 40° C. to about 95° C.

16. A method for stabilizing a catalytic process, the method comprising:
   a) separating a partially spent ionic liquid catalyst from a reaction product;
   b) feeding a portion of the partially spent catalyst to a regeneration zone, wherein the partially spent ionic liquid catalyst includes bound conjunct polymer;
   c) contacting the partially spent catalyst with aluminum metal under regeneration conditions to provide a catalytic composition comprising i) reactivated ionic liquid catalyst and ii) free conjunct polymer, wherein AlCl3 is formed by reaction of the aluminum metal with the partially spent catalyst;
   d) adding an organic catalyst precursor to the catalytic composition; and
   e) forming the ionic liquid catalyst de novo by reacting the catalyst precursor with the AlCl3, wherein the catalyst precursor is at least partially coated with a hydrophobic material prior to the adding step wherein the catalyst precursor is selected from the group consisting of compounds of formulas A, B, C, and D:

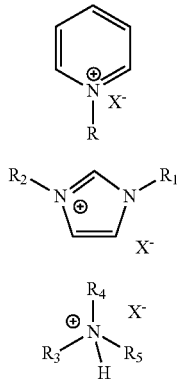

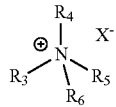

wherein X is halide, each of R, R1, and R2=H, methyl, ethyl, propyl, butyl, pentyl or hexyl, wherein R1 and R2 may or may not be the same; and each of R3, R4, R5, and R6=methyl, ethyl, propyl, butyl, pentyl or hexyl, wherein R3, R4, R5, and R6 may or may not be the same, and wherein the hydrophobic material is selected from the group consisting of a wax, an oil, a resin, and a polymer.

17. The method according to claim 16, wherein the coated catalyst precursor is added to the catalytic composition prior to, concurrently with, or subsequent to the contacting step.

* * * * *